Jan. 14, 1941.    J. A. SPENCER    2,228,854
TAPE FEEDING DEVICE
Filed March 15, 1938    2 Sheets-Sheet 2
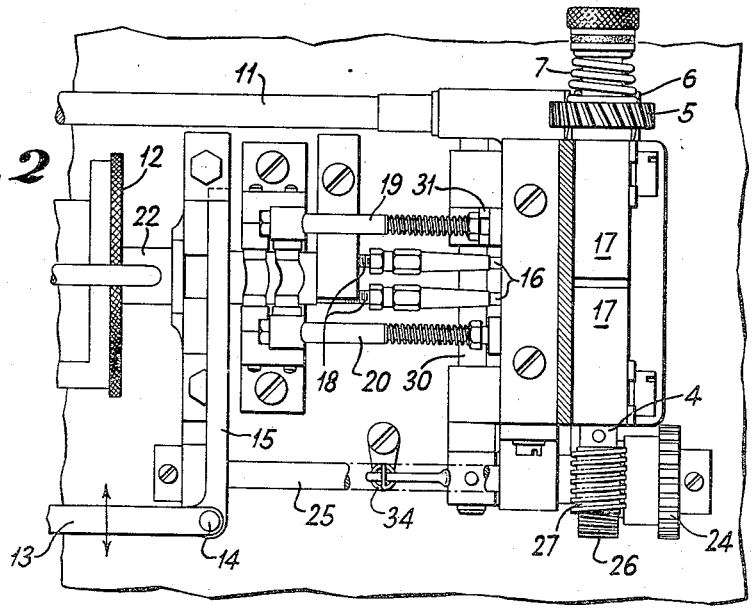
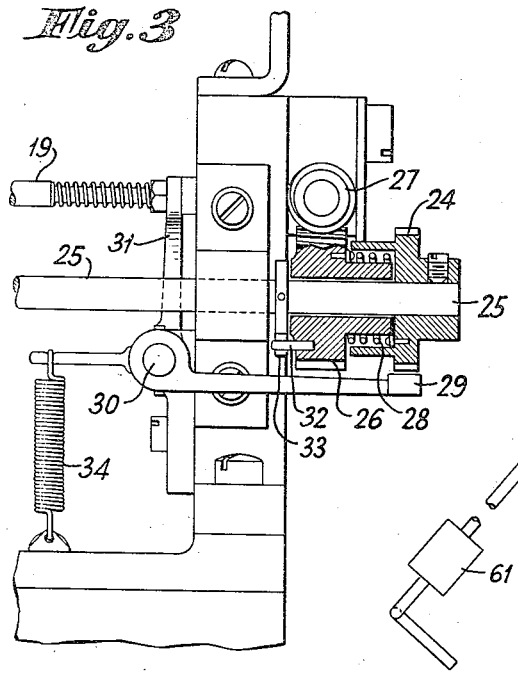
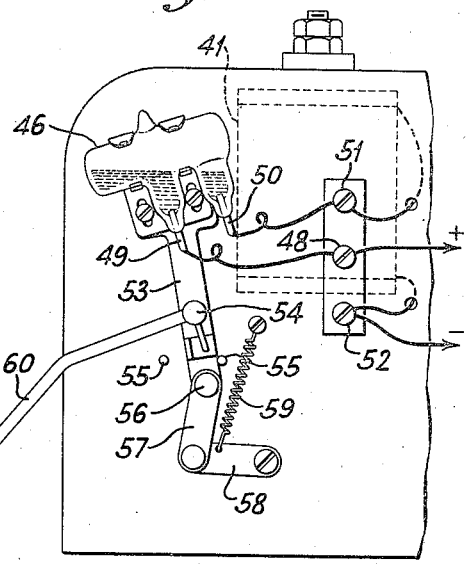
INVENTOR.
JAMES A. SPENCER
BY
ATTORNEY.

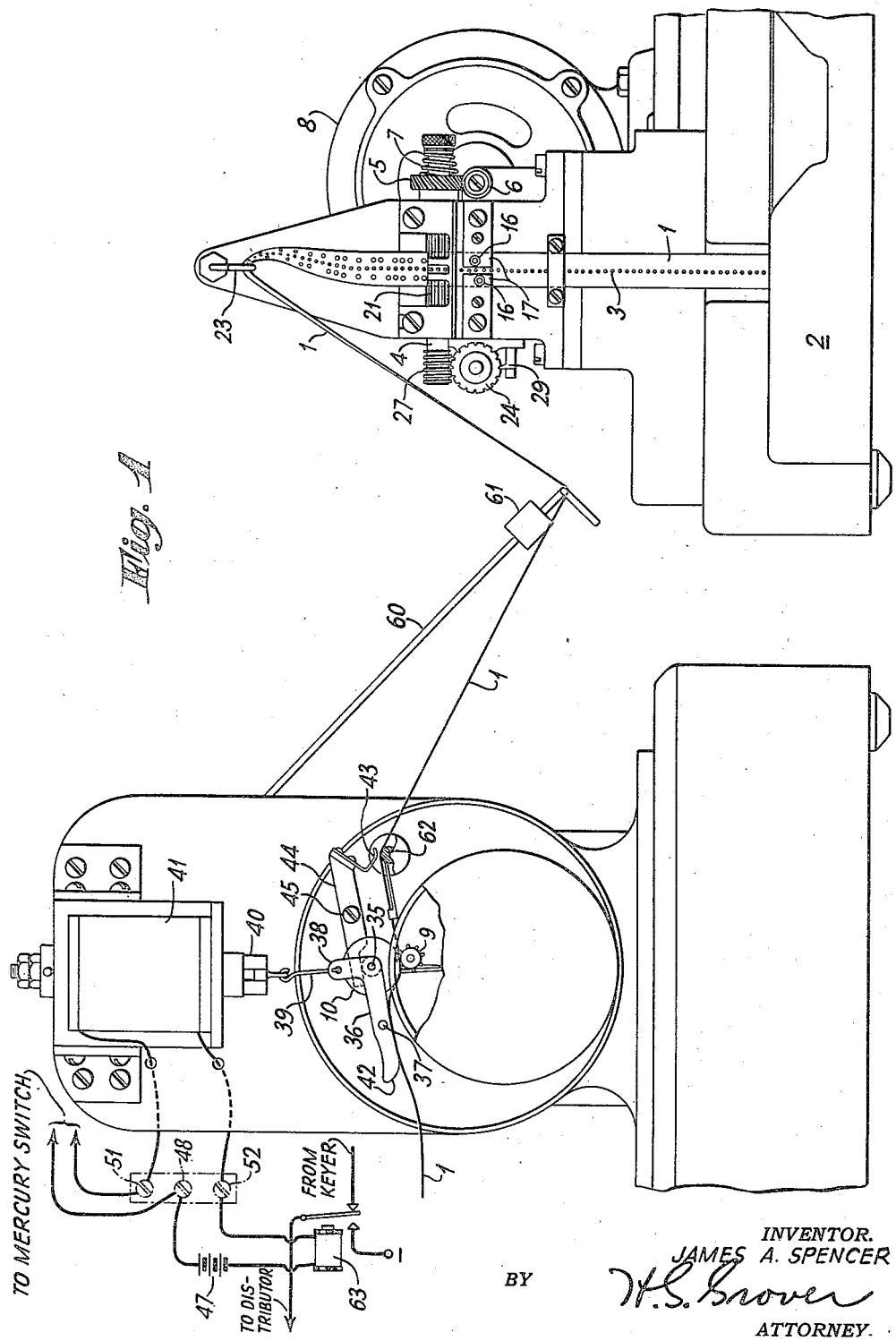

Patented Jan. 14, 1941

2,228,854

UNITED STATES PATENT OFFICE 2,228,854

TAPE FEEDING DEVICE

James A. Spencer, Teaneck, N. J., assignor to Radio Corporation of America, a corporation of Delaware Application March 15, 1938, Serial No. 195,964

11 Claims. (Cl. 178—92)

This invention relates to tape feeding devices as used in telegraph signal recording and retransmission. Reperforators as exemplified by those used in connection with Continental Morse and Cable Code telegraph systems are so designed that the tape feeds continuously through the device regardless of whether code signals are being received. This is true both of the Creed type and of the Wheatstone type reperforators. Unless these instruments are shut down after the transmission of a message it is obvious that quantities of tape are wasted.

Utility for my invention is to be found in the operation of reperforators and retransmitters when these machines are placed as close to one another as is possible and where the reperforator feeds the tape directly to the retransmitter. In the ordinary operation of reperforating and retransmitting a code message it is desirable to provide automatic means whereby upon the cessation of signals a predetermined amount of tape will continue to be fed from the reperforator toward the transmitter so that the message itself may be completely retransmitted. My invention, therefore, comprehends mechanical means for starting and stopping the tape feed mechanism of the reperforator, these means being responsive to signalling impulses. The invention further provides means for controlling a synchronous multiplex transmitter so that, when the tape intermediate between the perforator and the transmitter is drawn taut, the tape feed mechanism of the transmitter will be stopped without disturbing the synchronization and phase relation of the transmitter with respect to the co-operating units of the multiplex system.

In order that my invention may be practiced successfully it is apparent that the tape feeding mechanisms of the reperforator and of the transmitter should be jointly controlled or that the operation of stopping the tape feed in the transmitter should be made dependent upon the stopping of the tape feed in the reperforator. There is, however, always a minimum length of tape which must be fed from the punches of the reperforator to the perforation sensing means of the transmitter after cessation of the received signals in order that a message may be completely retransmitted.

It is one of the objects of my invention to provide tape feed mechanism associated with a telegraph code signal reperforator whereby a predetermined length of tape shall be permitted to feed out of the reperforator after the cessation of signal reception and before the feeding of the tape is stopped.

It is a further object of my invention to provide tape feeding mechanism associated with a transmitter which is adapted to arrest the motion of the tape through the transmitter without, however, disturbing the mesh relationship between the tape feed perforations, or center holes, and the sprocket teeth of the tape feed roll.

My invention will be described in full detail by reference to the accompanying drawings, in which Figure 1 is an assembly view of a conventional telegraph signal reperforator and along side of it a conventional telegraph signal retransmitter. The improved means for carrying out the objects of my invention are shown in association with these reperforating and retransmitting instruments;

Fig. 2 shows a fragmentary plan view of the reperforator having associated therewith the improved tape feed mechanism of my invention;

Fig. 3 shows a side view in elevation and partly in cross-section of the tape feed control mechanism applied to the reperforator;

Fig. 4 shows a rear view detail of mechanism associated with the retransmitter and operable under control of a loop in the tape for engaging and disengaging the tape with the sprocket wheel in the retransmitter.

Referring first to Fig. 1, the reperforator is arranged to operate upon a roll of tape 1 which is pulled from a roll within a drawer 2 located in the framework of the apparatus. The tape is pulled upwardly by a sprocket wheel the teeth of which engage with the center holes 3 in the tape. This sprocket wheel is hidden behind the tape but is mounted on a shaft 4, which shaft is rotated by a worm wheel 5 and a worm 6. The worm wheel 5 is frictionally engaged with a shoulder on the shaft 4 by means of a spring 7. The worm 6 is constantly driven by a motor 8. The frictional engagement between the worm wheel 5 and the shaft 4, therefore, permits the shaft 4 to be arrested when it is desired to stop the feeding of the tape.

On the left side of Fig. 1 is shown a conventional telegraph code signal transmitter operable under control of perforations in the tape 1. This transmitter is provided with a sprocket wheel 9 which is normally rotated continuously. The tape is normally held against this sprocket wheel by means of a roll 10. Further details of the tape feed mechanism as applied to the retransmitter will be described hereinafter.

Referring again to the tape feed mechanism of the reperforator, the details thereof will best be understood by reference to Figs. 1, 2 and 3 generally, since certain portions of the mechanism appear to best advantage from different points of view. The plan view of Fig. 2 shows certain elements of a conventional reperforator which include a shaft 11 connecting the motor 8 (shown in Fig. 1) with the worm 6. The motor 8 also drives an intermittently operable clutch mechanism part of which is shown at 12. In order to engage and disengage the clutch 12 with a constantly motor driven counter-shaft, a signal responsive lever system is utilized. This lever system includes a receiving instrument armature 13 having a reciprocal motion as indicated by the double headed arrow. At the end of the armature and pivoted thereto at 14 is a link 15 by means of which the clutch mechanism and the timing of the operation of the punches is controlled. The punches 16 are shown in Fig. 1 as projecting through holes in the punch blocks 17. In Fig. 2 the punches 16 appear in alignment with plunger rods 18. In order to arrest the tape momentarily while the punches 16 are actuated it is customary to provide holding plungers 19 and 20 which are caused to engage with corrugations 21 of a collar on the shaft 4. Plunger 19 operates in response to a marking signal and plunger 20 in response to a spacing signal. Accordingly, there is a cam mechanism provided on the shaft 22 and cam followers engageable therewith each associated with one of the plungers 19 or 20 for actuating the plungers in proper time relation to the actuation of the punches 16. The punch plunger rods 18 are also provided with cam followers so that the marking and spacing holes will be spaced along the tape in accordance with the timing of the reciprocal motions of the receiving instrument armature 13.

As long as signals are being received, the armatures 13 will vibrate back and forth and produce a punching of the tape in accordance with the dots and dashes of the telegraph code signals. The perforated tape issuing from the punch blocks is carried upward and over a supporting member 23 whence it is brought down into a loop and carried over to the feeding mechanism of the retransmitter. When, however, the reception of signals ceases, the improved mechanism of my tape feeding device is brought into play as follows:

This mechanism includes a ratchet wheel 24 fastened rigidly to a shaft 25. Loosely mounted on this shaft 25 is a worm wheel 26 which engages with a worm 27 on the end of the tape feed sprocket wheel shaft 4. A helical spring 28 is anchored at one end to the ratchet wheel 24 and at the other end to the worm wheel 26. A pawl 29 pivoted on the horizontal shaft 30 engages and disengages with the ratchet wheel 24. When it is engaged the ratchet wheel 24 is prevented from turning and the continuous rotation of the worm 27 causes the worm wheel 26 to wind up the helical spring 28. In the normal course of traffic reception, however, the pawl 29 is disengaged from the ratchet wheel 24 with every marking impulse. Upon each disengagement of the pawl 29 with the ratchet wheel 24 the spring 28 unwinds and thereafter the ratchet wheel 24 and the worm wheel 26 are rotated as though they were integral.

The control of the pawl 29 is effected by means of a yoke arm 31 mounted on the shaft 30 and engageable with a collar and nut on the tape sprocket arresting plunger 19, this plunger being actuated upon reception of a marking signal. Normally the pawl 29 is pressed against the ratchet wheel 24 by virtue of the tension of the coil spring 34 which exercises a pulling action on a rearwardly projecting arm of the pawl member. Upon the cessation of signals the pawl 29 remains in engagement with the ratchet wheel 24. The extent of lost motion between the rotation of the worm wheel 26 and the ratchet wheel 24 is determined by the positions of two stop pins 32 in the worm wheel 26. A collar having thereon a stop 33 is engageable with the pins 32 and is fixed to the shaft 25.

It is required that the reperforator shall continue to feed tape to the retransmitter until the last of the message perforations has reached the pecker-pins of the retransmitter. Thus, ordinarily, a length of blank tape of some 15 inches, more or less, will issue from the reperforator before its feeding mechanism is stopped. To provide for this length of tape feed, a suitable gear ratio is adopted between the worm wheel 26 and its driving worm 27 so that the pin 32 carried by the worm wheel 26 will be moved through the arc subtended by the stop pins 33. After a predetermined lapse of time following the cessation of signals, one of the pins 32 is definitely arrested by the stop 33, the latter being motionless at the time, because during this interval the shaft 25 and ratchet wheel 24 are locked by the inactive pawl 29. Since the worm wheel 26 can no longer turn, the worm 27 is also arrested and a slippage occurs between the driving worm wheel 5 and the shaft 4 while the motor 8 continues to rotate.

It will thus be seen that the sprocket wheel in the reperforator can move no further until the resumption of signal reception.

Referring now to the tape feed apparatus which is associated with the transmitter as shown on the left side of Fig. 1, it will be observed that the tape feed roll 10 which is opposed to the sprocket wheel 9 is supported in bearings 35 of a pivotally mounted member 36, the pivot center of which is at 37. The member 36 has an upwardly extending projection 38 which has connected thereto a link 39. This link is actuated upwardly and downwardly by means of an armature 40 of a solenoid 41. When the solenoid is energized, the member 36 lifts the tape roll 10 and allows the tape 1 to be disengaged from the sprocket wheel 9. This disengagement is caused by flexing the paper tape into a loop directly above the sprocket wheel and by pressure thereon of a tail piece 42 forming an integral part of the member 36. The tape is also definitely arrested by the braking action of a flat spring 43 mounted on the end of a lever arm 44 whose pivot center is at 45. The member 44 has an extension which rests upon the axle of the tape roll 10. Accordingly, it will be seen that when the solenoid 41 is actuated not only will the tape be disengaged from the sprocket wheel 9 permitting the sprocket wheel to continue rotating without advancing the tape, but also the tape itself is brought to a position in which it is securely held by pressure of the brake spring 43 thereon. Hence, when the solenoid 41 is released, the downward movement of the roll 10 will permit the sprocket wheel to again mesh with the center holes of the tape for restoring the tape feed operation.

The operation of the solenoid 41 is under control of a mercury switch 46, best shown in Fig. 4. The energizing source 47 is connected through a binding post 48 directly to one terminal 49 which enters the bottom of a pool in the mercury switch tube. The other terminal 50 of this mercury switch tube leads to a second mercury pool and is connected through a terminal post 51 with one terminal of the solenoid winding 41. The other terminal of this solenoid winding leads to a terminal 52 which is connected with the opposite side of source 47.

The mercury switch 46 is mounted on a supporting member 53 pivoted at 54 and adapted to swing through a certain arc within the limits defined by the stop pins 55. The supporting member 53 extends downwardly below the pivot center 54 and has linked thereto on the center 56 a lever mechanism comprising members 57 and 58 which function as toggle members under the tension of a spring 59 so that the switch supporting member 53 may be definitely held in either of two positions. A snap action of the mercury switch is thus provided, even though the control lever arm 60 is raised and lowered slowly. The effect of drawing the tape taut, that is, of shortening the loop in the tape, is to raise the lever arm 60 by causing a bent end of this arm to ride on and be supported by the tape loop. When this arm-lifting motion reaches a predetermined point the mercury switch tube 46 is moved into a position whereby the two mercury pools are united into one pool, thus closing the circuit for actuating the solenoid. The mercury switch will remain in this position so long as the tape remains taut. Upon resuming the reception of message signals whereby the tape feed device of the reperforator is again put into action, the tape assumes a sufficient slack for the lever arm 60 to drop down under its own weight and the weight of a counter-balance 61. This, as can readily be seen, will restore the mercury tube 46 to the position in which it is shown in the drawings, whereat the mercury in the two pools is separated for opening the solenoid circuit. The snap action of the toggle members has sufficient lag after the commencement of the downward movement of lever arm 60 so that the possibility of stripping the feed holes in the tape is avoided.

The various components of the two distinct tape feeding mechanisms will be understood by the foregoing description to have a definite mutual cooperation for the purpose of economizing not only in paper tape but in wear and tear on various moving parts of the reperforating and retransmitting apparatus. Another desirable result which is obtained in carrying out my invention is that the tape feed mechanism associated with the transmitter can be actuated without disturbing the synchronism and phasing of the keying contactors with respect to other units of a multiplex system. That is to say, the driving motor for the transmitter whose speed is governed by the synchronizing system, as well known in the art, may continue to rotate the cams for operation of the contactors while at the same time the tape feed device is arrested and the sprocket wheel 9 is disengaged from the tape 1. In synchronous multiplex systems this feature is of considerable importance, since it is unnecessary to re-establish the synchronism of the transmitter every time it is intended to resume traffic operation after a delay of any duration.

Another advantage which is gained in carrying out my invention as above described is that the transmitter is not required to transmit marking and spacing reversals bearing no intelligence as it would if permitted to run without any tape.

As a modification of my invention it is within the scope thereof to provide a relay in series with the solenoid 41 and to provide the tongue of said relay with contacts in series with the signalling circuit, these contacts being arranged to open the circuit or to impress a constant spacing current on the signalling line when the tape arresting mercury switch 46 is closed. This feature is illustrated in Fig. 1 by a showing of the relay 63 whose armature is connected to the line. The back contact is connected to the transmitter contacts and the front contact is connected to the current source, say, negative, which is used for a spacing impulse.

Various modifications of my invention will be suggested by the foregoing description to those who are skilled in the art. Such modifications, however, will be understood to be within the scope of the claims so far as the breadth thereof will permit.

I claim:

1. In a system of the class described, a motor driven tape perforating mechanism, a code signal responsive device for controlling the operation of said mechanism, a tape feeding device having a friction clutch connection with a continuously rotatable element of said mechanism, means for momentarily restraining the operation of said tape feeding device during a single operation of said perforating mechanism, means for further restraining the operation of said tape feeding device after a predetermined delay period following the cessation of signals, said delay period being sufficient to permit of issuance of a substantial length of unrecorded tape from said perforating mechanism, and means under control of said signal responsive device for releasing said restraining means.

2. In a system of the class described, a code signal responsive device, a tape recorder, a tape feeding mechanism therefor, a motor frictionally engaged with said tape feeding mechanism for driving the same, a ratchet wheel having a resilient driven member in connection with said feeding mechanism, said member being adapted to store mechanical energy while said ratchet wheel is restrained from turning and to turn said ratchet wheel when it is released, means operative in the absence of signals for restraining said ratchet wheel from turning, and locking means associated with said ratchet wheel and operative to arrest said tape feeding mechanism after a predetermined length of unrecorded tape has issued therefrom.

3. In a signal responsive tape perforator having a motor and a tape feeding device frictionally connected to said motor, means operable in response to marking and spacing impulses for momentarily arresting said feeding device while perforating a signal-representing hole in the tape, means including a resilient energy storage member and a rigid stop member operable after a predetermined length of tape has been permitted to issue from said perforator bearing no signal-representing holes for locking said feeding device, and means responsive to a subsequent operation of the first said means for unlocking said feeding device.

4. In combination with a signal responsive tape perforator and retransmitter, a tape feeding device associated with the perforator, means for frictionally driving said feeding device during the reception of signals, means for continuing the operation of said feeding device for a predetermined time interval following the cessation of signals, means for locking said feeding device after the lapse of said predetermined time interval, means for unlocking said feeding device in response to the resumption of signal reception by said perforator, a second tape feeding device associated with said retransmitter and provided with a continuously rotatable tape feed sprocket roll, electromagnetic means for engaging and disengaging said tape with said sprocket roll, and circuit switching means operable under control of the degree of tautness of tape between the perforator and retransmitter for energizing and de-energizing said electro-magnetic means.

5. In a telegraph repeater having a signal-responsive tape recorder and a tape controlled retransmitter, tape feeding mechanisms associated respectively with the recorder and with the retransmitter, a separate motor for driving each tape feeding mechanism, a frictional connection between one motor and the feeding mechanism for the recorder, a sprocket roll driven by the second motor and constituting part of the feeding mechanism for the retransmitter, means operable upon the cessation of signal reception for causing blank tape to be dleivered in a loop from one tape feeding device to the other, means thereafter operable for locking the recorder feeding mechanism, and means operable in response to a take-up of slack in said loop for disengaging the tape from said sprocket roll.

6. A device in accordance with claim 5 and having a mercury switch mounted on a snap-acting toggle member, said switch constituting part of the last said means, and said means including further a solenoid under control of said switch, the armature of said solenoid being mechanically associated with a tape guide means adapted to engage and disengage the tape from said sprocket.

7. In a tape-feeding device for a telegraph transmitter, a sprocket roll, a tape guide, said tape guide serving normally to press the tape against the sprocket roll, said guide being movable into a position for flexing said tape away from said sprocket roll, a brake member integral with said guide for holding said tape when disengaged from said sprocket roll, a solenoid for actuating said guide, a mercury switch for controlling said solenoid, and means under control of the slack in the tape served to said feeding device for closing and opening said switch.

8. In a tape perforator, a motor, a tape feed roll, a friction clutch interconnecting the motor and the feed roll, a tape perforating mechanism, a selecting mechanism responsive to signals for controlling the perforating mechanism, means operative under control of the selecting mechanism for instantly arresting the feed roll to permit of concisely perforating the tape, means enabling said motor and feed roll to advance the tape normally during the reception of signals and for an appreciable predetermined period following the cessation of signals, means operative at the end of said period for arresting said feed roll, and means operative in response to a subsequent signal for causing the normal motion of said feed roll to be resumed.

9. A device in accordance with claim 8 and including a worm on the shaft of said feed roll, a worm wheel continuously meshed with said worm, a ratchet wheel resiliently driven by said worm wheel and a pawl for arresting said ratchet wheel, said pawl being included in the means operative at the end of said predetermined period.

10. In a telegraph tape feeding mechanism, a feed roll for engaging the tape, a motor, a friction clutch for enabling said feed roll to be driven intermittently by said motor, means responsive to the reception of a single telegraph impulse for momentarily arresting said feed roll, and means operative after the lapse of a predetermined period during which no telegraph impulses are received for locking said feed roll.

11. A device according to claim 10 in which the last said means is constituted by a worm and worm-wheel assembly, a ratchet-wheel and an impulse-responsive pawl engaging with said ratchet-wheel, said worm being integrally associated with said feed roll, said worm-wheel having a resilient driving connection with said ratchet-wheel, said pawl being operable in response to received telegraph impulses to permit of intermittent movement of said ratchet-wheel, and a pair of mutually engaging stop members, one mounted on said worm-wheel and the other being driven by said ratchet-wheel, said members serving to lock said feed roll.

JAMES A. SPENCER.